(12) United States Patent
Beamon

(10) Patent No.: US 6,870,900 B1
(45) Date of Patent: *Mar. 22, 2005

(54) PROACTIVE MAINTENANCE APPLICATION

(75) Inventor: Elizabeth Ann Beamon, Kannapolis, NC (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 286 days.

This patent is subject to a terminal disclaimer.

(21) Appl. No.: 09/726,751

(22) Filed: Nov. 30, 2000

Related U.S. Application Data

(60) Provisional application No. 60/212,207, filed on Jun. 16, 2000.

(51) Int. Cl.[7] .......................... H04M 1/24; H04M 3/08; H04M 3/22
(52) U.S. Cl. .................... 379/9.03; 379/9.02; 379/9.04; 379/29.09; 379/27.01
(58) Field of Search .......................... 379/1.01, 9, 9.01, 379/9.02, 9.04, 9.06, 10.01, 14, 15.01, 26.01, 26.02, 27.01, 27.04, 27.07, 29.01, 32.01, 32.02, 32.05

(56) References Cited

U.S. PATENT DOCUMENTS

| | | | |
|---|---|---|---|
| 4,972,453 A | | 11/1990 | Daniel, III et al. |
| 5,521,958 A | * | 5/1996 | Selig et al. .................... 379/21 |
| 5,692,144 A | | 11/1997 | Thrush |
| 5,710,648 A | | 1/1998 | Frigo |
| 5,790,633 A | * | 8/1998 | Kinser, Jr. et al. ....... 379/10.01 |
| 5,790,634 A | | 8/1998 | Kinser et al. |
| 5,933,816 A | | 8/1999 | Zeanah et al. |
| 5,937,168 A | | 8/1999 | Anderson et al. |
| 5,953,389 A | * | 9/1999 | Pruett et al. .................... 379/9 |
| 5,970,477 A | | 10/1999 | Roden |
| 6,018,576 A | | 1/2000 | Croslin |
| 6,026,145 A | | 2/2000 | Bauer et al. |
| 6,032,121 A | | 2/2000 | Dietrich et al. |

(List continued on next page.)

FOREIGN PATENT DOCUMENTS

| | | |
|---|---|---|
| EP | 0 650 302 | 4/1995 |
| WO | WO 98 24222 | 6/1998 |

*Primary Examiner*—Quoc Tran
(74) *Attorney, Agent, or Firm*—Cantor Colburn LLP

(57) ABSTRACT

Methods and systems for proactively maintaining a telephone system local loop. One embodiment includes acquiring at least one type of information selected from the group consisting of information from a Dynamic Network Analyzer and information from a Loop Facilities and Control System. This information is stored in memory, and the stored information is combined. This method may also include predicting proactive maintenance based upon the combined information. Another embodiment includes communicating with a communications network and acquiring at least one type of information selected from the group consisting of customer information associated with copper line pairs and service information associated with copper line pairs. The acquired information is stored in memory and combined to predict proactive maintenance of the telephone system local loop. Still another embodiment describes a system including software modules communicating with a communications network. A Dynamic Network Analyzer module communicates with the communications network and acquires Dynamic Network Analyzer information. A Loop Facilities and Control System module communicates with the communications network and acquires Loop Facilities and Control System information. A database interfaces with the Dynamic Network Analyzer module and with the Loop Facilities and Control System module, with the database storing the Dynamic Network Analyzer information and the Loop Facilities and Control System information. A processor is also included, and the processor is capable of processing information stored in the database and of generating proactive maintenance.

17 Claims, 12 Drawing Sheets

U.S. PATENT DOCUMENTS

| | | |
|---|---|---|
| 6,208,776 B1 | 3/2001 | Prohaska et al. |
| 6,295,540 B1 | 9/2001 | Sanschagrin et al. |
| 6,353,902 B1 * | 3/2002 | Kulatunge et al. .......... 714/712 |
| 6,445,774 B1 | 9/2002 | Kidder et al. |
| 6,493,694 B1 * | 12/2002 | Xu et al. ...................... 706/47 |
| 6,529,877 B1 | 3/2003 | Murphy et al. |
| 6,614,882 B1 * | 9/2003 | Beamon et al. .......... 379/27.01 |

* cited by examiner

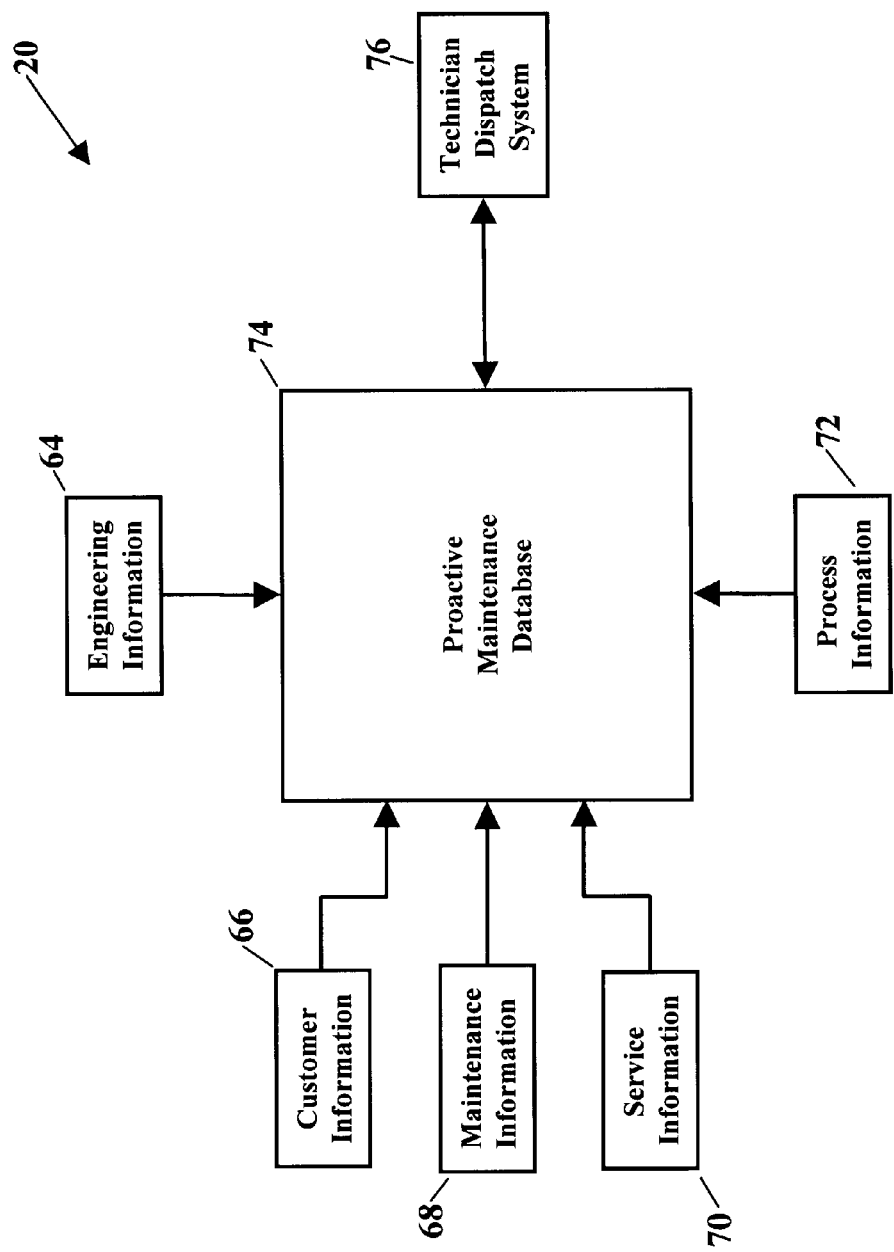

PROACTIVE MAINTENANCE APPLICATION

CROSS-REFERENCE TO RELATED APPLICATIONS

This application claims the benefit of U.S. Provisional Application No. 60/212,207, filed Jun. 16, 2000.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to methods for predicting proactive maintenance and, more particularly, to methods and systems for predicting proactive maintenance of the Public Switched Telephone Network.

2. Description of the Related Art

Most residential and business telephone customers are connected to telephone systems by copper cables and wires. These copper cables are the familiar one or more telephone lines running throughout nearly every home in the United States. Because copper cable and wire connects each home, and many businesses, to the telephone system, the Public Switched Telephone Network is composed of billions of copper cables and wires. Each of these copper cables must be maintained to provide superior telephone service to the customer.

Yet these copper cables and wires are known to deteriorate and to degrade service. Copper cable and wire suffers from exposure to ozone, summer heat, winter cold, and water. Copper cables and wires are often strung from telephone poles, buried underground, and installed within the walls and floors of buildings. This environmental exposure is acute in older buildings and neighborhoods where the telephone lines were installed twenty-five (25) to fifty (50) years ago. Copper cables and wires, in fact, are known to deteriorate at approximately twelve percent (12%) to fifteen percent (15%) per year. The public telephone system, with its billions of copper telephone lines, requires a structured, proactive maintenance plan to ensure telephone customers receive the highest quality telephone service available in the market.

Telephone service providers, however, are challenged when monitoring and tracking proactive maintenance procedures. Currently proactive maintenance is assigned, dispatched, and tracked in a manual environment. Management relies upon individual experience to determine when, and where, proactive maintenance is performed. Management recommends proactive maintenance, and management's recommendation funnels down to supervisors. Supervisors manually write work orders describing the proactive maintenance procedures. These work orders are then assigned to field technicians. The field technician performs the proactive maintenance and then informs the supervisor. The supervisor completes a ticket describing the completed work order, and the ticket funnels back up to management. This manual process is slower than desired, and management would prefer a rapid response to customer requests.

Individual experience and style also influence proactive maintenance efforts. Some managers strongly believe in proactive maintenance. Other managers are less familiar with proactive maintenance. Telephone customers, as a result, often have differing experiences in quality and service. Some managers know immediately what copper cables and wires are operational and ready for customer use. Other managers have a backlog of repairs and require more time to learn what lines are functioning. This varied management style reduces the ability of telephone companies to execute a unified, customer service plan.

The manual environment also does not adequately prioritize proactive maintenance. A manager may often have a backlog of proactive maintenance work order. This backlog may be assigned without a focus on the core importance of customer service. A technician, for example, may be assigned to paint a graffiti-covered crossconnect box, even though some customers are without telephone service. The manual environment too easily allows technician efforts to be mistakenly assigned to lower-priority repair work.

The manual environment also hampers bulk repair efforts. Because the manual environment does not collect and track repair work, managers and technicians have little knowledge of other repair efforts. One technician may be dispatched to a location to repair a single copper cable, and the next day another technician may be dispatched to the same location to repair another copper cable. A single technician, however, could have repaired both copper cables in a single assignment. Bulk repair is especially important when we remember there may be thousands of copper cables branching from the crossconnect boxes. The manual environment hinders managers from assigning and tracking bulk copper cable repairs to avoid unnecessary labor costs.

The manual environment also inadequately measures technician proficiency. Although some technicians can repair many copper cables in a few hours, other technicians may not be as efficient and may require more time. The manual environment simply counts the number of work orders a technician completed. The manual environment cannot monitor what really matters to internal customers; that is, the actual number of copper cables repaired by the technician. The manual environment, then, cannot monitor technician efficiency and cannot objectively measure technician performance. The manual environment fails to objectively reward technicians for their actual efforts.

There is, accordingly, a need in the art for methods and systems for predicting proactive maintenance of the Public Switched Telephone Network. These methods and systems will preferably monitor and track proactive maintenance procedures, reduce the influence of erratic management styles and beliefs, prioritize and assign bulk proactive maintenance procedures, and objectively measure technician proficiency.

BRIEF SUMMARY OF THE INVENTION

The aforementioned problems are reduced by a Proactive Maintenance Application. The Proactive Maintenance Application comprises a system that may be implemented in a computer program. The Proactive Maintenance Application acquires information representing many different departments, disciplines, and operations. The Proactive Maintenance Application, for example, may acquire one, or more, of the following types of information: engineering information, customer information, maintenance information, service information, and even real-time process information. The Proactive Maintenance Application acquires information and then combines the information to predict and to prioritize proactive maintenance procedures.

Once the Proactive Maintenance Application predicts and prioritizes the proactive maintenance procedures, the Proactive Maintenance Application may even have another feature that creates and dispatches work orders. These work orders describe the proactive maintenance procedures that should be performed. Still another optional feature assigns the work orders to a particular technician. The technician receives the work orders and performs the predicted proactive maintenance procedures.

The Proactive Maintenance Application may be utilized for one or more functions. The Proactive Maintenance Application may monitor proactive maintenance, may assign proactive maintenance, and may track proactive maintenance. Because the Proactive Maintenance Application collects information from various departments and operations, one advantage is that the Proactive Maintenance Application provides a centralized database for proactive maintenance. The Proactive Maintenance Application may also be used to monitor the condition of equipment and facilities and predict what proactive maintenance should be performed. The Proactive Maintenance Application may also generate work orders describing the predicted proactive maintenance and then track the progress and completion of the work order. The Proactive Maintenance Application may even automatically update the centralized database so that management has a complete, accurate view of equipment and facilities.

The Proactive Maintenance Application may also be utilized to assign proactive maintenance in bulk. Bulk repairs reduce labor costs and improve revenue. Because the Proactive Maintenance Application monitors information from many departments, the Proactive Maintenance Application can assign a single technician to perform many overlapping repairs. The Proactive Maintenance Application can even identify what specialized skills and equipment will be needed to complete a repair and, once identified, assign those technicians that have the needed skills and equipment. The Proactive Maintenance Application may thus advantageously reduce labor costs by reducing redundant technician dispatches. Bulk repairs also quickly provide more facilities for more customers and, thus, more revenue for the company.

It should be understood that the foregoing description of the Proactive Maintenance Application system is intended to provide an overview of the many separate inventions encompassed therein. Each of the separate inventive features of the Proactive Maintenance Application system is described in more detail below.

BRIEF DESCRIPTION OF THE SEVERAL VIEWS OF THE DRAWINGS

These and other features, aspects, and advantages of the mobile re-radiating antenna are better understood when the following Detailed Description of the Invention is read with reference to the accompanying drawings, wherein:

FIG. 3 is a block diagram showing one embodiment of the Proactive Maintenance Application;

DETAILED DESCRIPTION OF THE INVENTION

Figure 1:
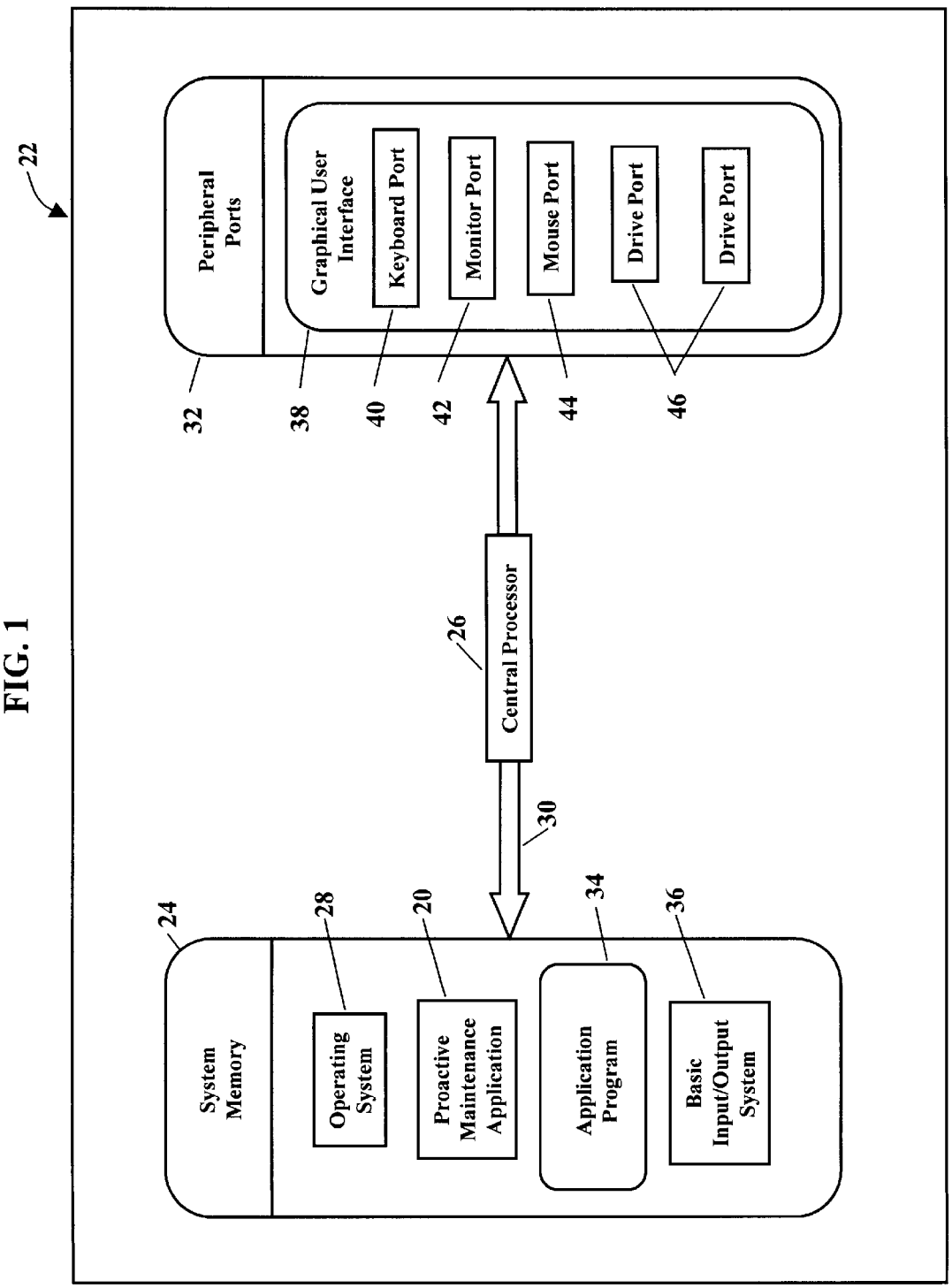
FIG. 1 is a block diagram showing the Proactive Maintenance Application residing in a computer system.

The present invention particularly relates to methods and systems for proactively maintaining a telephone system local loop. An embodiment of the present invention comprises acquiring at least one of loop engineering information from a Loop Engineering Information System, information from a Dynamic Network Analyzer, and information from a Loop Facilities and Control System. This information is stored in memory, and the stored information is combined. The combined information may be weighted. This embodiment may also include predicting proactive maintenance based upon the combined information. The embodiment may generate and dispatch work order information describing the predicted proactive maintenance.

Another embodiment of the present invention comprises communicating with a communications network and acquiring at least one of loop engineering information, customer information associated with copper line pairs, and service information associated with copper line pairs. The acquired information is stored in memory and combined to predict proactive maintenance of the telephone system local loop. The acquired information may be weighted when combined.

In another aspect a system of the present invention comprises software modules communicating with a communications network. Some examples of possible software modules include: a Loop Engineering Information System module for communicating with the communications network and for acquiring loop engineering information; a Dynamic Network Analyzer module for communicating with the communications network and for acquiring Dynamic Network Analyzer information; and a Loop Facilities and Control System module for communicating with the communications network and acquiring Loop Facilities and Control System information. A database may interface with the module(s), with the database storing the acquired information. The system may further comprise a processor capable of processing information stored in the database and of generating proactive maintenance.

Still another aspect describes computer program products for proactively maintaining a telephone system. One computer program product comprises a computer-readable medium and a Dynamic Network Analyzer module stored on the medium. The Dynamic Network Analyzer module couples to a Dynamic Network Analyzer over a communications network, and the Dynamic Network Analyzer module acquires information concerning the Dynamic Network Analyzer. Another computer program product comprises a computer-readable medium and a Loop Facilities and Control System module stored on the medium. The Loop Facilities and Control System module couples to a Loop Facilities and Control System over a communications network, the Loop Facilities and Control System module acquires information concerning the Loop Facilities and Control System. Still another computer program product comprises a computer-readable medium and a Loop Engineering Information System module stored on the medium. The Loop Engineering Information System module couples to a Loop Engineering Information System over a communications network, and the Loop Engineering Information System module acquires loop engineering information.

"Proactive maintenance" predicts what maintenance procedures should be performed to avoid later, catastrophic equipment failures. The objective is to predict and perform equipment maintenance before the equipment actually begins to fail. The systems and methods described herein can be utilized to acquire information representing many different departments, disciplines, and operations. All this information may then be used to predict the early stages of equipment failure. The systems and methods thus allow engineers and field technicians to correct early-stage failures before the normal progression of failure starts. The systems and methods of the present invention may advantageously be used to determine the need for equipment repair, or for equipment replacement, in time to avoid more catastrophic equipment failures.

Figure 2:
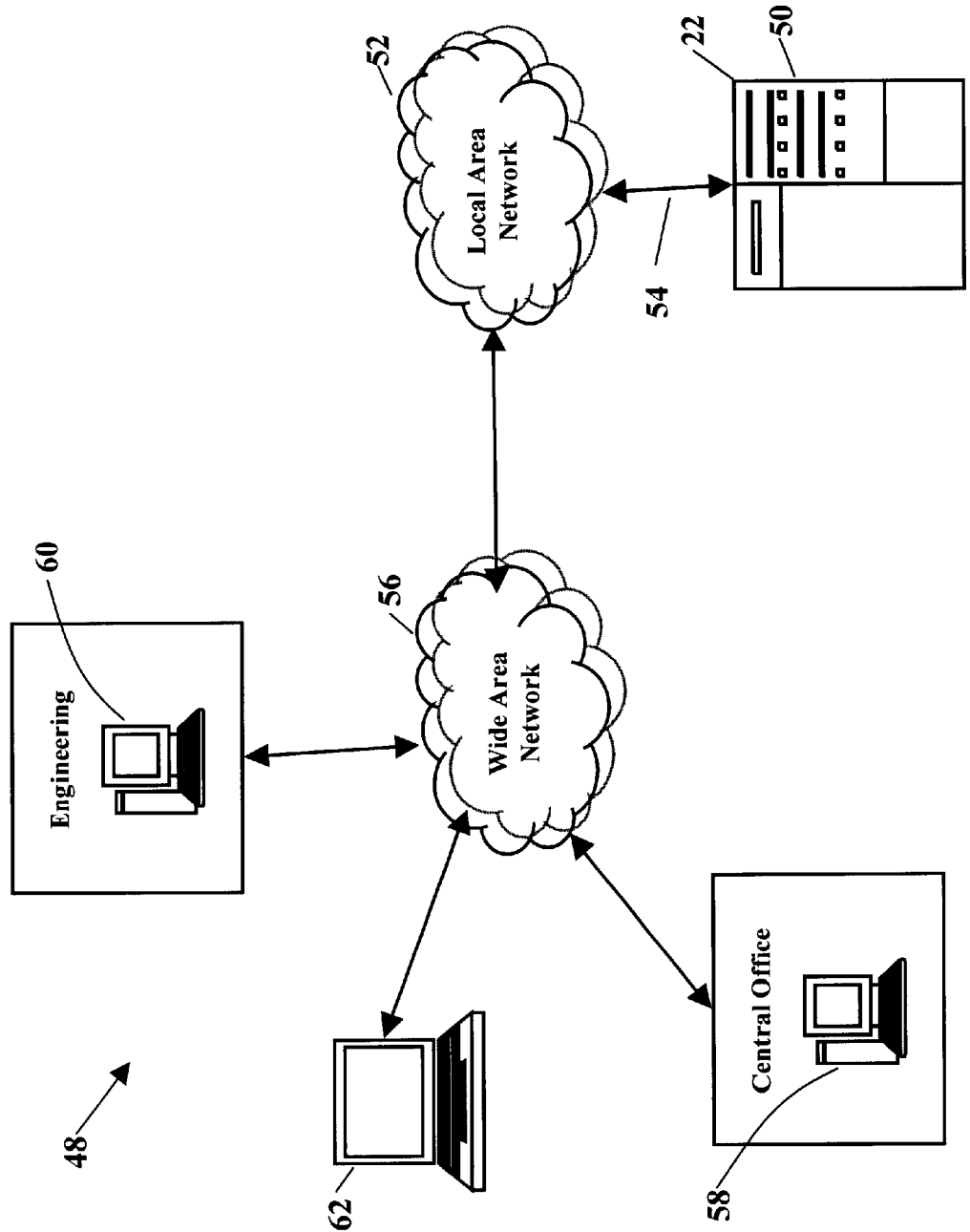
FIG. 2 is a block diagram of a communication network representing the operating environment for the Proactive Maintenance Application.

FIGS. 1 and 2 depict a possible operating environment for an embodiment of the present invention in computer software. This embodiment of a Proactive Maintenance Application 20 comprises a computer program that acquires information and predicts proactive maintenance. As those skilled in the art of computer programming recognize, computer programs are depicted as process and symbolic representations of computer operations. Computer components, such as a central processor, memory devices, and display devices, execute these computer operations. The computer operations include manipulation of data bits by the central processor, and the memory devices maintain the data bits in data structures. The process and symbolic representations are understood, by those skilled in the art of computer programming, to convey the discoveries in the art.

FIG. 1 is a block diagram showing the Proactive Maintenance Application 20 residing in a computer system 22. The Proactive Maintenance Application 20 may be stored within a system memory device 24. The computer system 22 also has a central processor 26 executing an operating system 28. The operating system 28 also resides within the system memory device 24. The operating system 28 has a set of instructions that control the internal functions of the computer system 22. A system bus 30 communicates signals, such as data signals, control signals, and address signals, between the central processor 26, the system memory device 24, and at least one peripheral port 32. While the computer system 22 is a Hewlett Packard 9000, those skilled in the art understand that the program, processes, methods, and systems described in this patent are not limited to any particular computer system or computer hardware.

Those skilled in art also understand the central processor 26 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450). The Intel Corporation also manufactures a family of X86 and P86 microprocessors (Intel Corporation, 2200 Mission College Blvd., Santa Clara, Calif. 95052-8119, 408.765.8080). Other manufactures also offer microprocessors. Such other manufactures include Motorola, Inc. (1303 East Algonquin Road, P.O. Box A3309 Schaumburg, Ill. 60196), International Business Machines Corp. (New Orchard Road, Armonk, N.Y. 10504, (914) 499-1900), and Transmeta Corp. (3940 Freedom Circle, Santa Clara, Calif. 95054). While only one microprocessor is shown, those skilled in the art also recognize multiple processors may be utilized. Those skilled in the art further understand that the program, processes, methods, and systems described in this patent are not limited to any particular manufacture's central processor.

The system memory 24 also contains an application program 34 and a Basic Input/Output System (BIOS) program 36. The application program 34 cooperates with the operating system 28 and with the at least one peripheral port 32 to provide a Graphical User Interface (GUI) 38. The Graphical User Interface 38 is typically a combination of signals communicated along a keyboard port 40, a monitor port 42, a mouse port 44, and one or more drive ports 46. The Basic Input/Output System 36, as is well known in the art, interprets requests from the operating system 28. The Basic Input/Output System 36 then interfaces with the keyboard port 40, the monitor port 42, the mouse port 44, and the drive ports 46 to execute the request.

The operating system 28 is WINDOWS NT® (WINDOWS NT® is a registered trademark of Microsoft Corporation, One Microsoft Way, Redmond, Wash. 98052-6399, 425.882.8080). WINDOWS NT® is preinstalled in the system memory device 24 on the Hewlett Packard 500. Those skilled in the art also recognize many other operating systems are suitable, such as UNIX® (UNIX® is a registered trademark of the Open Source Group) Linux, and Mac® OS (Mac® is a registered trademark of Apple Computer, Inc., 1 Infinite Loop, Cupertino, Calif. 95014, 408.996.1010). Those skilled in the art again understand that the program, processes, methods, and systems described in this patent are not limited to any particular operating system.

FIG. 2 is a block diagram of a communications network 48. This communications network 48 further represents an operating environment for the Proactive Maintenance Application (shown as reference numeral 20 in FIG. 1). The Proactive Maintenance Application resides within the memory storage device (shown as reference numeral 24 in FIG. 1) in the computer system 22. The computer system 22 is conveniently shown as a computer server 50 representing the Hewlett Packard 500. The computer system 22 communicates with a Local Area Network (LAN) 52 along one or more data communication lines 54. As those skilled in the art have long understood, the Local Area Network 52 is a grid of communication lines through which information is shared between multiple nodes. These multiple nodes are conventionally described as network computers. As those skilled in the art also recognize, the Local Area Network 52 may itself communicate with a Wide Area Network (WAN) 56. The communications network 48 allows the Proactive Maintenance Application to request and acquire information from many computers connected to the Local Area Network 52 and the Wide Area Network 56. The communications network 48 may even communicate with a globally distributed computing network.

As FIG. 2 shows, the Proactive Maintenance Application requests and acquires information from many other computers connected to the communications network 48. The Proactive Maintenance Application, for example, acquires information from a switching computer 58 located within at a telephone system's central office. The Proactive Maintenance Application could also acquire information from an engineering computer 60 at an engineering facility. FIG. 2 even shows that remote users, such as field technicians, may use a portable computer 62 to dial into the communications network 48 and remotely access the Proactive Maintenance Application. Because many computers may be connected to the communications network 48, computers and computers users may share and communicate a vast amount of information.

FIG. 3 is a block diagram showing one embodiment of the Proactive Maintenance Application 20. The Proactive Maintenance Application 20 is a computer program platform that acquires information from the communications network (shown as reference numeral 48 in FIG. 2) and uses this information to predict proactive maintenance procedures. As FIG. 3 illustrates, the Proactive Maintenance Application 20 may acquire information representing many different departments, disciplines, and operations. The Proactive Maintenance Application 20, for example, may acquire one or more of the following information types: engineering information 64, customer information 66, maintenance information 68, service information 70, and even real-time process information 72. The Proactive Maintenance Application 20 acquires this information and stores this information in a Proactive Maintenance Application Database 74. The Proactive Maintenance Application 20 then combines the acquired information, for example, the engineering information 64, customer information 66, maintenance information 68, service information 70, and/or real-time process information 72, to predict and to prioritize proactive maintenance procedures. The Proactive Maintenance Application 20 may further assign weights to each source of information to increase or decrease the influence of either combined component.

The engineering information 64 may represent various engineering activities. The engineering information 64, for example, could represent component or system durability test results, model shop equipment errors, or CAD/CAM dimensions and/or tolerances. The engineering information 64 may also represent component or system performance data, material specifications, or even government regulations. Any engineering-type information that could be used to predict proactive maintenance is considered within the ambit of the engineering information 64.

The customer information 66 may represent various customer activities. The customer information 66, for example, may represent actual customer purchasing preferences, marketing data, or customer product or process improvement suggestions. The customer information 66 may also represent customer demographic data, customer order information, or even customer profiles. Any customer-type information that could be used to predict proactive maintenance is considered within the ambit of the customer information 66.

The maintenance information 68 may represent various maintenance activities. The maintenance information 68, for example, may represent component replacement history, system or process performance history, or equipment repair history. The maintenance information 68 may also represent process measurement data, statistical process control data, maintenance logs, and even technician data. Any maintenance-type information that could be used to predict proactive maintenance is considered within the ambit of the maintenance information 68.

The service information 70 may represent various service activities. The service information 70, for example, may represent warranty information, unique or special service tooling information, limitations encountered during service repairs, or obstacles encountered during service repairs. The service information 70 may also represent field conditions (e.g., temperature, humidity, dust, and dirt), availability of original equipment manufacture (OEM) service parts, or even failure data. Any service-type information that could be used to predict proactive maintenance is considered within the ambit of the service information 70.

The real-time process information 72 may represent various process activities. The real-time process information 72, for example, may represent equipment wear indicators, gauge data, or process data (e.g., mold temperature data, cleaning/washing fluid turbidity data, or machine speed data). The real-time process information 72 may also represent re-work information, shift production data, or even line shut-down indicators. Any process-type information that could be used to predict proactive maintenance is considered within the ambit of the real-time process information 72.

The Proactive Maintenance Application 20 may even dispatch work orders. Once the Proactive Maintenance Application 20 predicts and prioritizes the proactive maintenance procedures, the Proactive Maintenance Application 20 then interfaces with a technician dispatch system 76 to create and dispatch work orders. These work orders describe the proactive maintenance procedures that should be performed. The Proactive Maintenance Application 20 may even assign the work orders to a particular technician. The technician receives the work orders and performs the predicted proactive maintenance procedures.

Those skilled and even unskilled in the art recognize the Proactive Maintenance Application 20 is applicable to many different environments, industries, and processes. The Proactive Maintenance Application 20 is especially applicable to the Public Switched Telephone Network. The Public Switched Telephone Network (PSTN) is composed of many switches and thousands of copper cables, copper wires, and fiber optic cables. These copper and fiber optic cables are often buried underground, strung from telephone poles, and tucked within the walls of buildings. Because these cables may deteriorate at approximately twelve percent (12%) to fifteen percent (15%) per year, the local telephone carrier needs to proactively maintain the system to provide quality telephone service. If the system is not adequately maintained, customer complaints increase, quality suffers, and costs increase.

Another reason to implement the Proactive Maintenance Application is local telephone competition. Where local telephone service was once a monopoly, competition is now coming to, the local arena. There will be a mix of copper cables, trunks, switches, and services provided by each local carrier. See ROBERT A. GABLE, TELECOMMUNICATIONS DEPARTMENT MANAGEMENT 232 (1999). Perhaps the most challenging aspect of this local competition is managing the local telephone system. See id. Local telephone service providers must maintain a meticulously accurate database of their respective cables and switches. No telephone company can afford to repair and maintain another company's cables and switches. The Proactive Maintenance Application 20 could improve a local service provider's competitive position by mechanizing maintenance procedures.

Figure 4A:
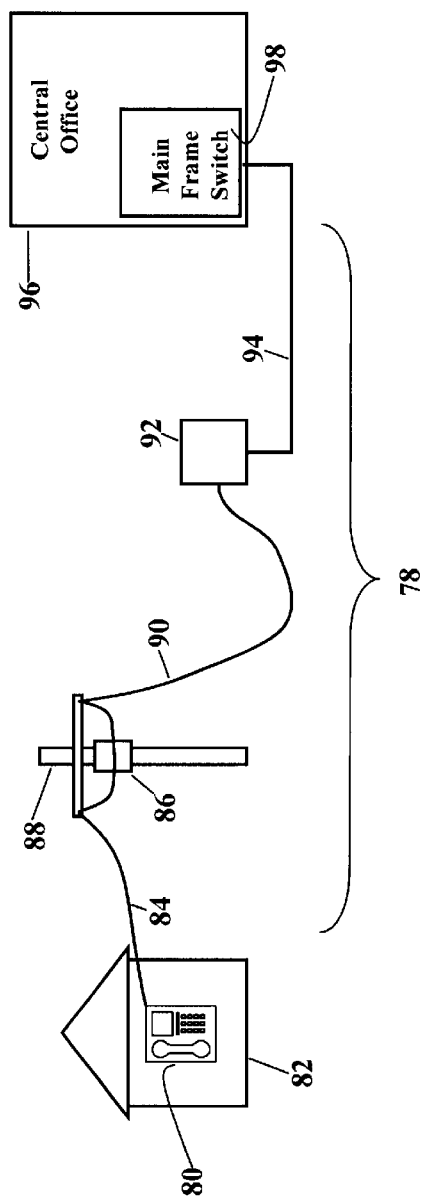
FIGS. 4A and 4B are diagrams illustrating a local loop of the Public Switched Telephone Network.
Figure 4B:
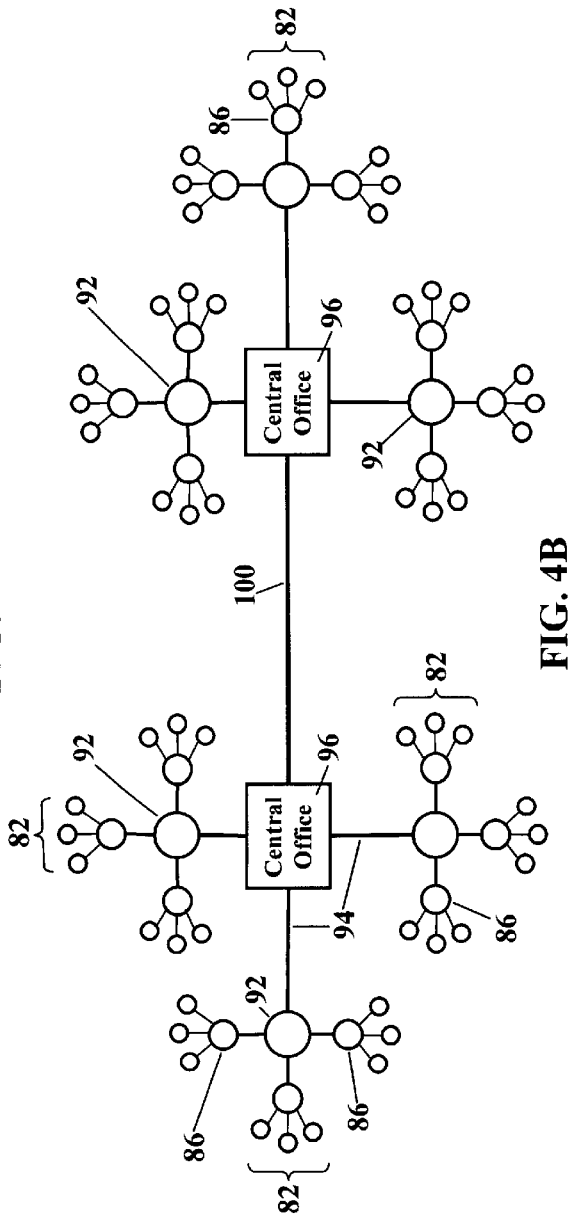

FIGS. 4A and 4B illustrate the need for proactive maintenance of the Public Switched Telephone Network. FIG. 4A is a diagram illustrating a local loop 78 of the Public Switched Telephone Network. The local loop 78 is the physical infrastructure that routes telephone calls between customers. A residential telephone customer, for example, places a call using terminal equipment 80 located inside a house 82. While FIG. 4A shows the terminal equipment 80 as a common telephone, the terminal equipment 80 could alternatively be a facsimile machine, personal computer modem, or other similar equipment. The terminal equipment 80 converts sound into electrical signals. The electrical signals travel along a copper line pair 84 to a small cross-connect 86. The small cross-connect 86 is shown located atop a utility pole 88, but the small cross-connect 86 could be located at ground level in newer installations. A distribution cable 90 carries the electrical signals from the small cross-connect 86 to a large cross-connect 92. A feeder cable 94 carries the electrical signals to a central office 96. Inside the central office is a main frame switch 98. The main frame switch 98 routes the electrical signals to the proper destination. See RICHARD A. THOMPSON, TELEPHONE SWITCHING SYSTEMS 71–72 (2000).

FIG. 4B shows the central office 96 may serve multiple local loops. While FIG. 4A shows only one (1) feeder cable 94, FIG. 4B shows that the central office 96 may serve multiple feeder cables. Each feeder cable 94 may carry thousands of copper line pairs to each respective large cross-connect 92. Each feeder cable 94, therefore, serves a different part of the community. Each large cross-connect 92, in turn, may serve as a distribution point for many small cross-connects 86. Each small cross-connect 86, in turn, serves many residential households 82. There may, in turn, be multiple central offices, with each central office 96 connected by a trunk line 100. See THOMPSON, supra, at 71. The complexity of the Public Switched Telephone Network is further magnified knowing there are approximately forty thousand (40,000) central offices located throughout the United States. See THOMPSON, supra, at 95. Such a complex system, with billions of copper line pairs and fiber optic cables, requires a meticulously detailed, logical, and simple maintenance system to ensure quality telephone service.

Figure 5:
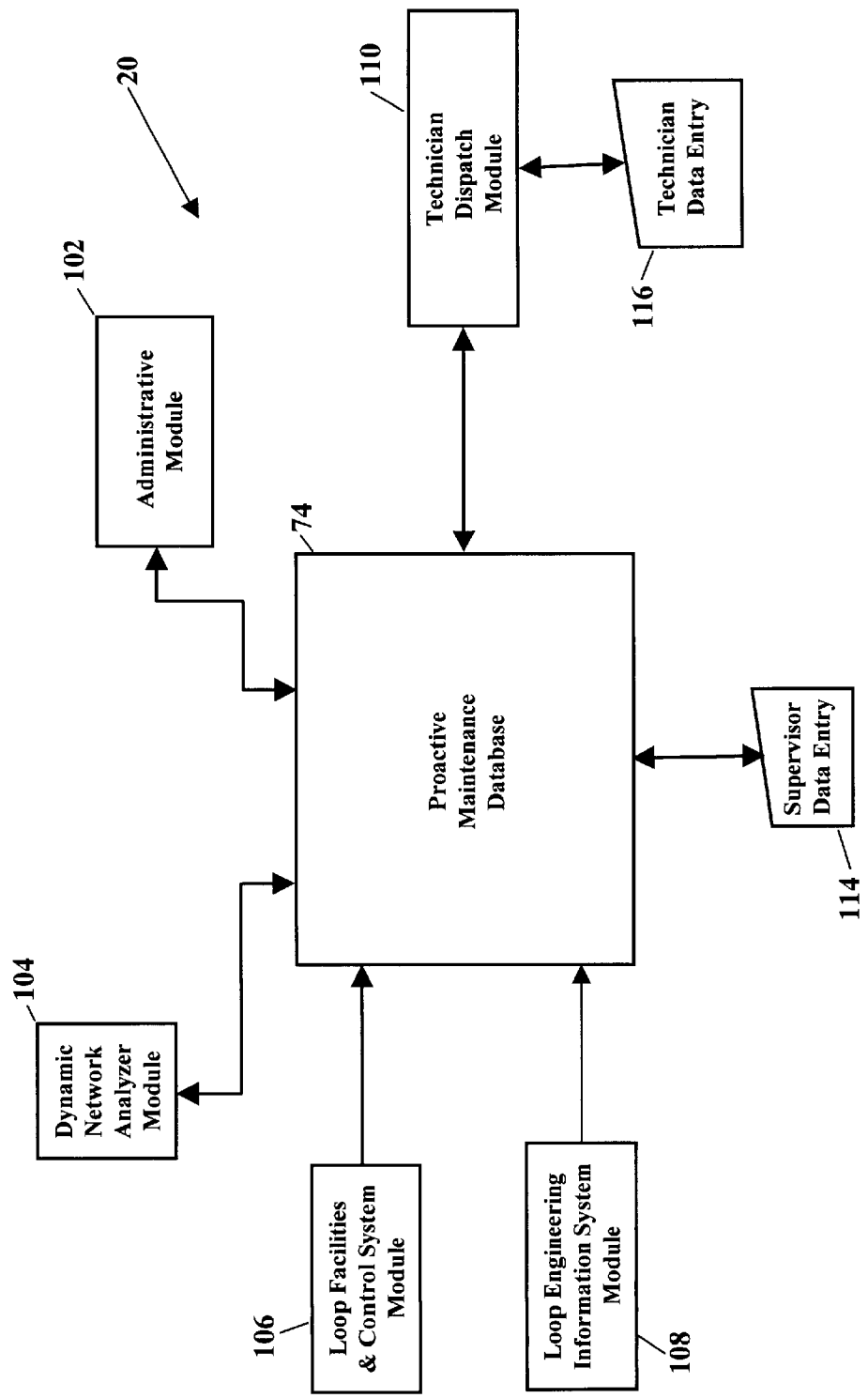
FIG. 5 is a block diagram showing an alternative embodiment of the Proactive Maintenance Application.

The Proactive Maintenance Application 20, therefore, is very useful for proactively maintaining the local loops of Public Switched Telephone Network. FIG. 5 is a block diagram showing an alternative embodiment configured for proactively maintaining the local loop (shown as reference numeral 78 in FIG. 4A). The Proactive Maintenance Application Database 74 interfaces with one or more data sources to predict any needed proactive maintenance. These data interfaces include an Administrative Module 102, a Dynamic Network Analyzer Module 104, a Loop Facilities and Control System Module 106, a Loop Engineering Information System Module 108, and a Technician Dispatch Module 110. The Proactive Maintenance Application Database 74, in addition, accepts manually-entered supervisor data 114 and manually-entered technician data 116. Each interface and data input provides information for predicting proactive maintenance procedures. The Proactive Maintenance Application Database 74 acquires and combines this information. The Proactive Maintenance Application Database 74 predicts, based upon the combined information, what proactive maintenance procedures should be performed to maintain the local loop. The Proactive Maintenance Application Database 74 prioritizes these proactive maintenance procedures. The Proactive Maintenance Application Database 74 then interfaces with the Technician Dispatch Module 110 to generate and to dispatch proactive maintenance work orders. These proactive maintenance work orders are assigned to field service technicians, and the field service technicians perform the predicted proactive maintenance procedures.

The Proactive Maintenance Application 20 may also track the status of work orders. Not only does the Proactive Maintenance Application 20 prioritize work orders, but the Proactive Maintenance Application 20 also receives progress updates. Users of the Proactive Maintenance Application 20 can learn the date a work order was (or will be) dispatched, the name of any assigned field technician, and whether the field technician has completed the work order. The field technician may even update the Proactive Maintenance Application 20 with progress reports, estimated completion time and date, any needed equipment, or any required support. The Proactive Maintenance Application 20 thus provides a common repository or database of pending and assigned work orders for all users to access and use.

The Proactive Maintenance Application 20 may also provide historical work order information. Because the Proactive Maintenance Application 20 stores all generated work orders, the Proactive Maintenance Application 20 provides an easy and quick access to historical work order information. The Proactive Maintenance Application 20, for example, could be searched to learn how many times a particular crossconnect has been serviced, how frequently a particular customer's line has been repaired, or what areas are especially prone to repair. This historical information enables the Proactive Maintenance Application 20, and the users of Proactive Maintenance Application 20, to improve proactive maintenance and to thus improve telephone service.

The Proactive Maintenance Application 20 may be physically embodied on or in a computer-readable medium. This computer-readable medium includes CD-ROM, DVD, tape, cassette, floppy disk, memory card, and a large-capacity disk (such as IOMEGA® ZIP®, JAZZ®, and other large-capacity memory products) (IOMEGA®, ZIP®, and JAZZ® are registered trademarks of Iomega Corporation, 1821 W. Iomega Way, Roy, Utah 84067, 801.332.1000). This computer-readable medium, or media, could be distributed to end-users, licensees, and assignees. These types of computer readable media, and other types not mentioned here but considered within the scope of the present invention, allow the Proactive Maintenance Application to be easily disseminated.

The Administrative Module 102

The Administrative Module 102 provides system administration. A systems administrator uses the Administrative Module 102 to maintain and to manage the Proactive Maintenance Application 20. The systems administrator can use the Administrative Module 102 to establish and define many parameters that the Proactive Maintenance Application 20 requires. The Administrative Module 102, for example, defines the users of the Proactive Maintenance Application 20, their passwords, and what privileges each user will have. The Administrative Module 102 may also be used to define security levels for accessing the Proactive Maintenance Application 20. One level of security, for example, may be established for those users accessing the Proactive Maintenance Application 20 from outside a network firewall. Another level of security could be established for those users accessing from within the network firewall. The Administrative Module 102 may also be used to add or remove printer destinations or even edit printer information. Field supervisors may also use the Administrative Module 102 to identify field service technicians who will be assigned proactive maintenance work orders. The Administrative Module 102, in short, manages the Proactive Maintenance Application 20 and pre-populates any administrative data required by other interfaces.

The Dynamic Network Analyzer Module 104

Figure 6:
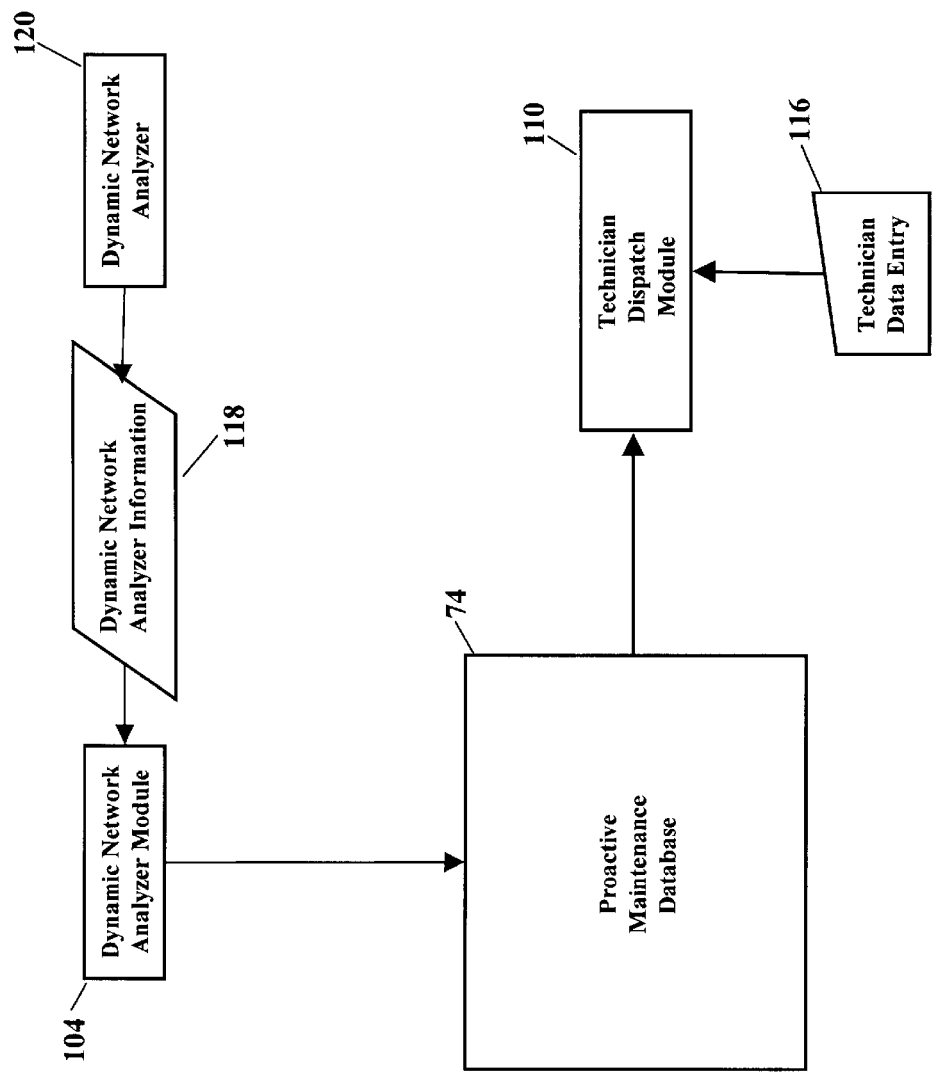
FIG. 6 is a block diagram of the Dynamic Network Analyzer Module 104 shown in FIG. 5.

FIG. 6 is a block diagram of the Dynamic Network Analyzer Module 104 shown in FIG. 5. The Dynamic Network Analyzer Module 104 provides historical information to the Proactive Maintenance Application Database 74. The Dynamic Network Analyzer Module 104 communicates with the communications network (shown as reference numeral 48 in FIG. 2) and acquires Dynamic Network Analyzer information 118 from a Dynamic Network Analyzer 120. The Dynamic Network Analyzer 120 is a software application that counts all customer trouble reports since a specific work order was issued or completed. These trouble reports, commonly referred to as Trouble Since Issued (TSI) reports, are utilized to re-prioritize open work orders on a daily basis. Each Trouble Since Issued report is associated with a particular feeder cable (shown as reference numeral 94 in FIGS. 4A and 4B) and a particular copper line pair within that feeder cable. The Dynamic Network Analyzer 120, for example, is typically run every week. The Dynamic Network Analyzer 120 generates a listing of what maintenance needs to be done based upon trouble history from customer trouble reports. The Dynamic Network Analyzer Module 104 communicates with the communications network and acquires the Dynamic Network Analyzer information 118 as an ASCII file. The Proactive Maintenance Application Database 74 acquires this ASCII file to create and prioritize maintenance work orders. The Proactive Maintenance Application Database 74 then interfaces with the Technician Dispatch Module 108 to generate and dispatch proactive maintenance work orders.

The Loop Facilities and Control System Module 106

Figure 7:
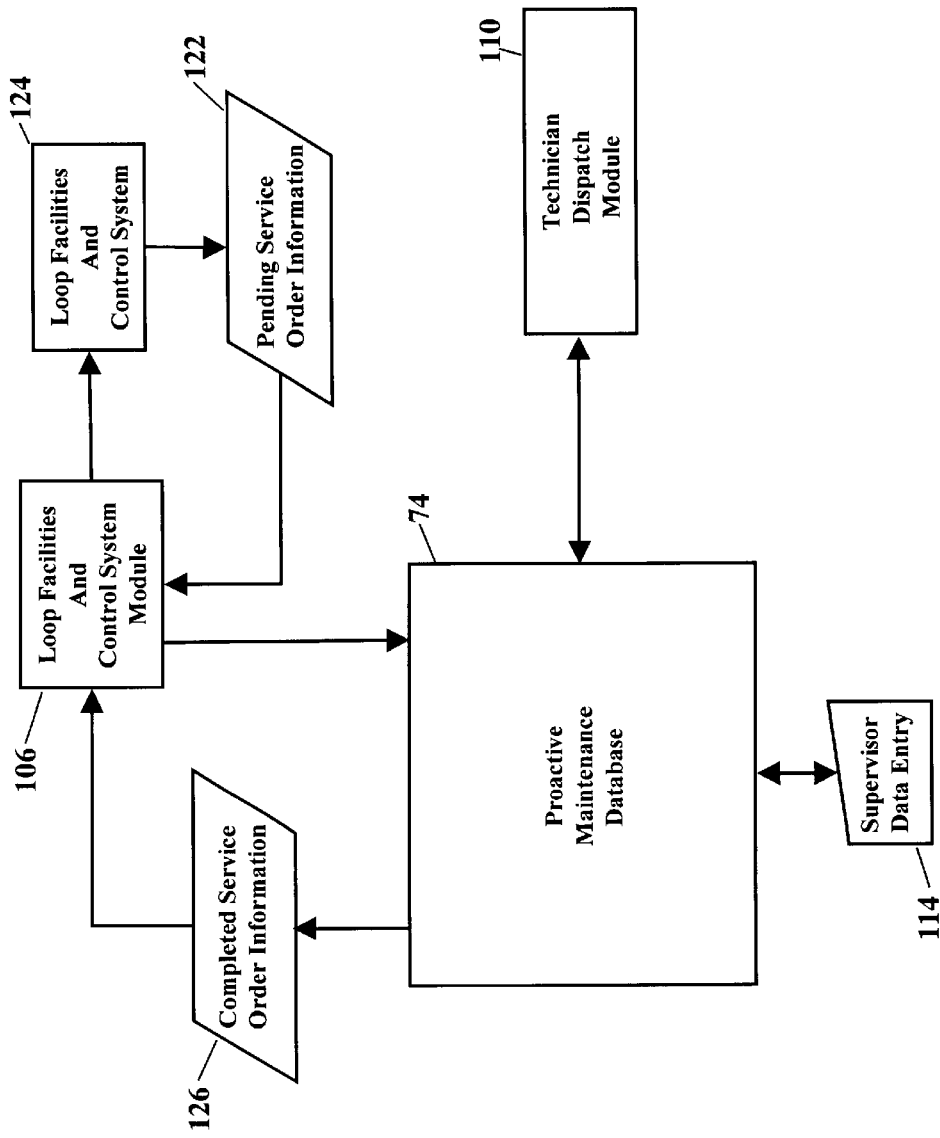
FIG. 7 is a block diagram of the Loop Facilities and Control System Module 106 shown in FIG. 5.

FIG. 7 is a block diagram of the Loop Facilities and Control System Module 106 shown in FIG. 5. The Loop Facilities and Control System Module 106 communicates with the communications network (shown as reference numeral 48 in FIG. 2) and acquires Pending Service Order Information 122 from a Loop Facilities and Control System 124. The Loop Facilities and Control System 124 maintains an engineering database of pending service orders. The Loop Facilities and Control System 124 provides the status of each copper line pair in a specified feeder cable (shown as reference numeral 94 in FIGS. 4A and 4B) associated with pending service orders. Pending service orders are conventionally written up manually and distributed from management down to the technician. This conventional distribution process is extremely slow, often requiring several weeks. The Loop Facilities and Control System Module 106, however, acquires the pending service order information 122 and merges the pending service order information 122 into a proactive maintenance work order. The Proactive Maintenance Application Database 74 then interfaces with the Technician Dispatch Module 110 to generate and dispatch proactive maintenance work orders. The field technician can complete both a proactive maintenance work order and a pending service order. The Proactive Maintenance Application 20 thus eliminates the manual paper trail and eliminates the very slow conventional process.

The Proactive Maintenance Application 20 also permits the technician supervisor to immediately update the Loop Facilities and Control System 124. Once the technician supervisor assigns a particular technician, the technician supervisor can email the pending service order information 122 directly to the field technician. The technician supervisor could alternatively generate the pending service order information 122 to the field technician's computer printer. The field technician receives the pending service order information 122, completes the service order, and returns the completed service order to the technician supervisor. The technician supervisor can then immediately log into the Proactive Maintenance Application 20 and manually update the system with the completed service order. This manually-entered supervisor data 114 is acquired by the Proactive Maintenance Application 20. The Proactive Maintenance Application 20 immediately communicates completed service order information 126 to the Loop Facilities and Control System Module 106. The Loop Facilities and Control System Module 106 communicates this completed service order information 126 to the Loop Facilities and Control System 124. The Loop Facilities and Control System 124 is immediately and automatically updated with any completed service orders.

The Proactive Maintenance Application 20 is a great improvement. Pending service orders with clear defective pairs were previously manually written and distributed from management down to the technician. Any pending service order could take weeks to funnel from central management down to the actual field technician. The Proactive Maintenance Application 20, however, compresses the time to complete a pending service order. The Proactive Maintenance Application 20 can now issue a pending service order in minutes. The Proactive Maintenance Application 20 also immediately and automatically updates the Loop Facilities and Control System 124 database of pending service orders. Thus whenever a pending service order is completed, the local telephone service provider knows within minutes that a copper line pair is available for use. The now-available copper line pair is ready to provide telephone service and to generate revenue for the local telephone service provider. The Proactive Maintenance Application 20, therefore, reduces service order response times, improves utilization of copper line pairs, and increases operational revenues.

Figure 8:
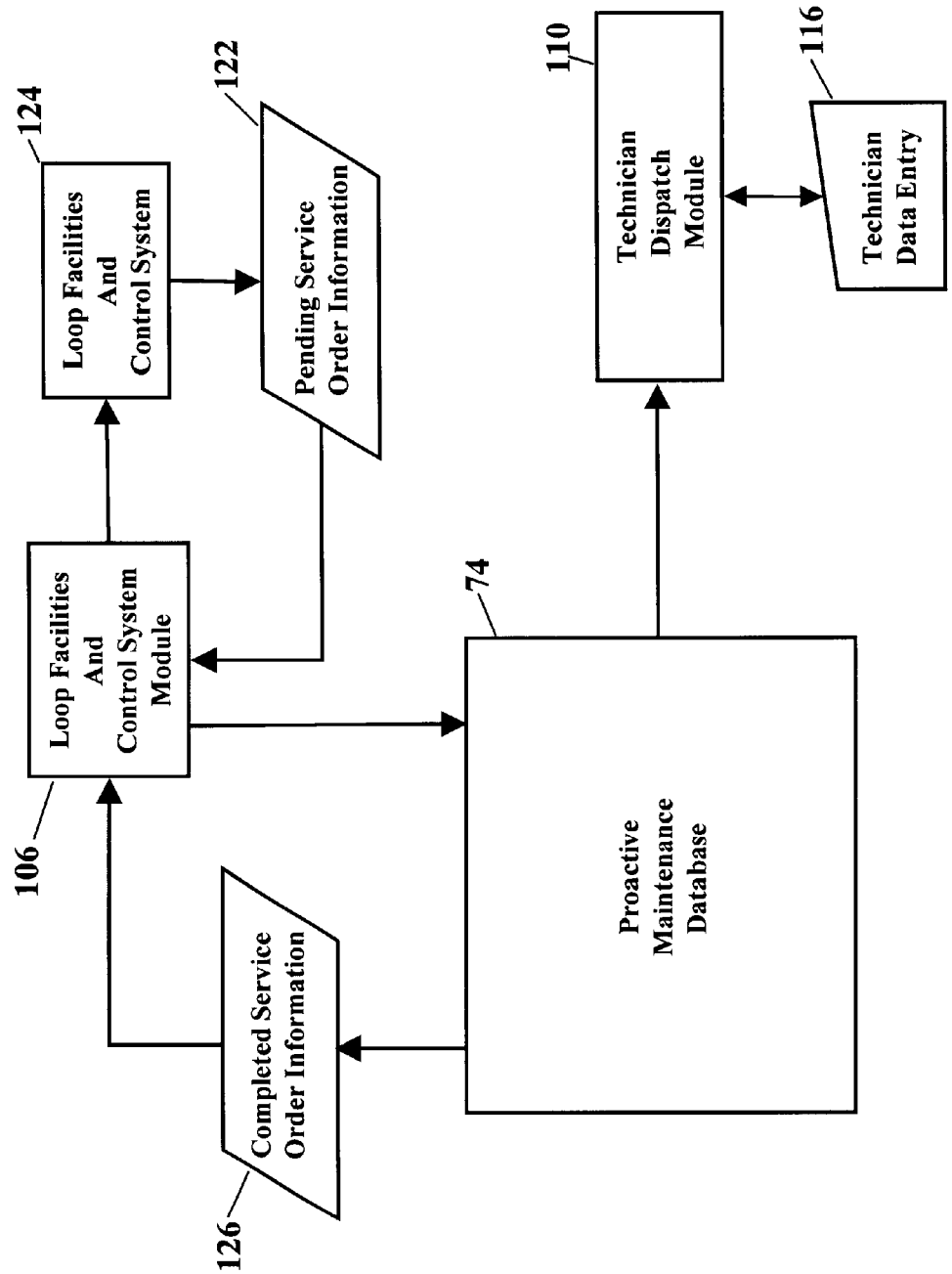
FIG. 8 is a functional block diagram of an alternate embodiment of the Loop Facilities and Control System Module 106 shown in FIG. 5.

FIG. 8 is a functional block diagram of an alternate embodiment of the Loop Facilities and Control System Module 106 shown in FIG. 5. This alternate embodiment allows the field technician to log onto into the Proactive Maintenance Application 20 and manually update the Proactive Maintenance Application 20 with a completed service order. This manually-entered technician data 116 is acquired by the Proactive Maintenance Application Database 74. The Proactive Maintenance Application Database 74 immediately passes the completed service order information 126 to the Loop Facilities and Control System Module 106. The Loop Facilities and Control System Module 106 sends this completed service order information 126 to the Loop Facilities and Control System 124. This embodiment allows the field technician to update the Loop Facilities and Control System 124 without supervisor effort.

The Loop Engineering Information System Module 108

Figure 9:
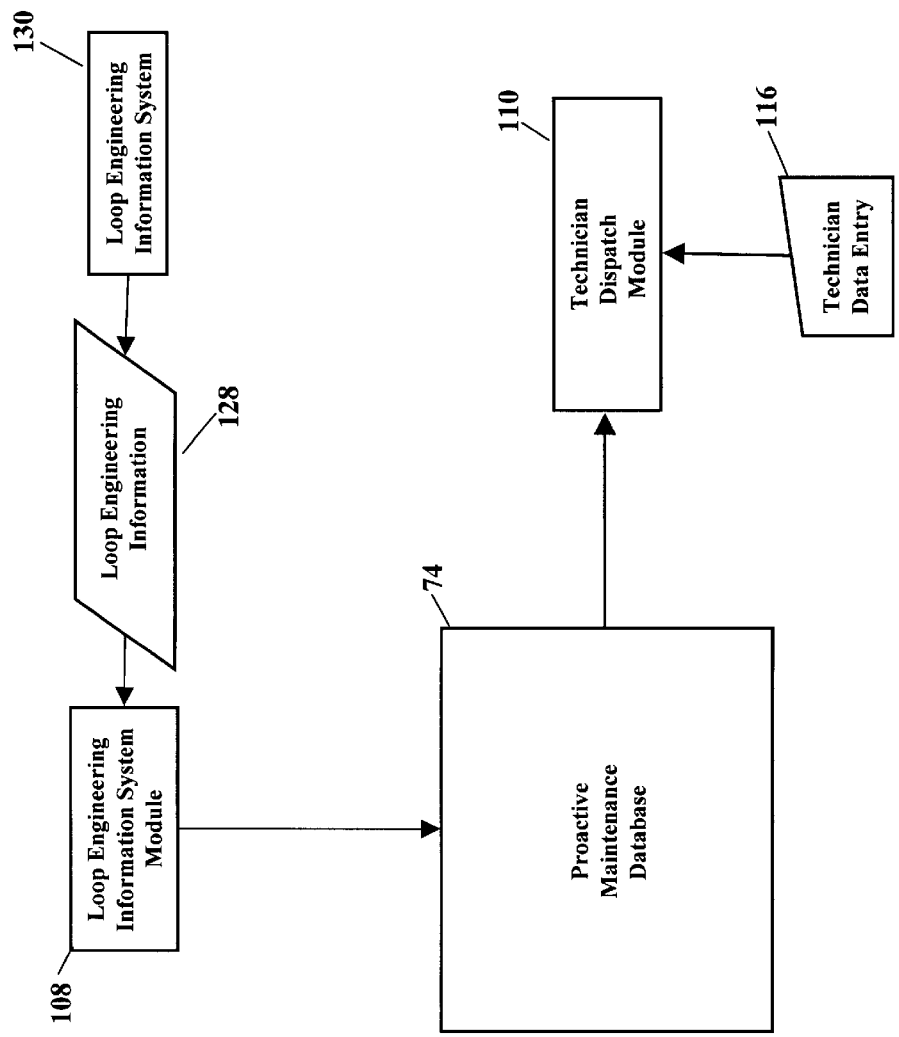
FIG. 9 is a block diagram of the Loop Engineering Information System module 108 shown in FIG. 5.

FIG. 9 is a functional block diagram of the Loop Engineering Information System Module 108 shown in FIG. 5. The Loop Engineering Information System Module 108 communicates with the communications network (shown as reference numeral 48 in FIG. 2) and acquires loop engineering information 128 from a Loop Engineering Information System 130. The Loop Engineering Information System 130 is a network of computers that monitor the cross-connect (shown as reference numeral 86 in FIGS. 4A and 4B) and the local loop (shown as reference numeral 78 in FIG. 4A). The Loop Engineering Information System Module 108 provides historical growth for each cross-connect. The loop engineering information 128 may include the number of spare, working, and defective copper line pairs for each cross-connect. The loop engineering information 128 may also include loop facility modification data, specifically wired-out limits, and service order defective facility modes (e.g., service order defects) for specific cable and line pairs. The Loop Engineering Information System Module 108 acquires the loop engineering information 128, and the Proactive Maintenance Application uses the loop engineering information 128 to create and to prioritize maintenance work orders. The Proactive Maintenance Application Database 74 then interfaces with the Technician Dispatch Module 110 to generate and dispatch proactive maintenance work orders.

The Technician Dispatch Module 110

Figure 10:
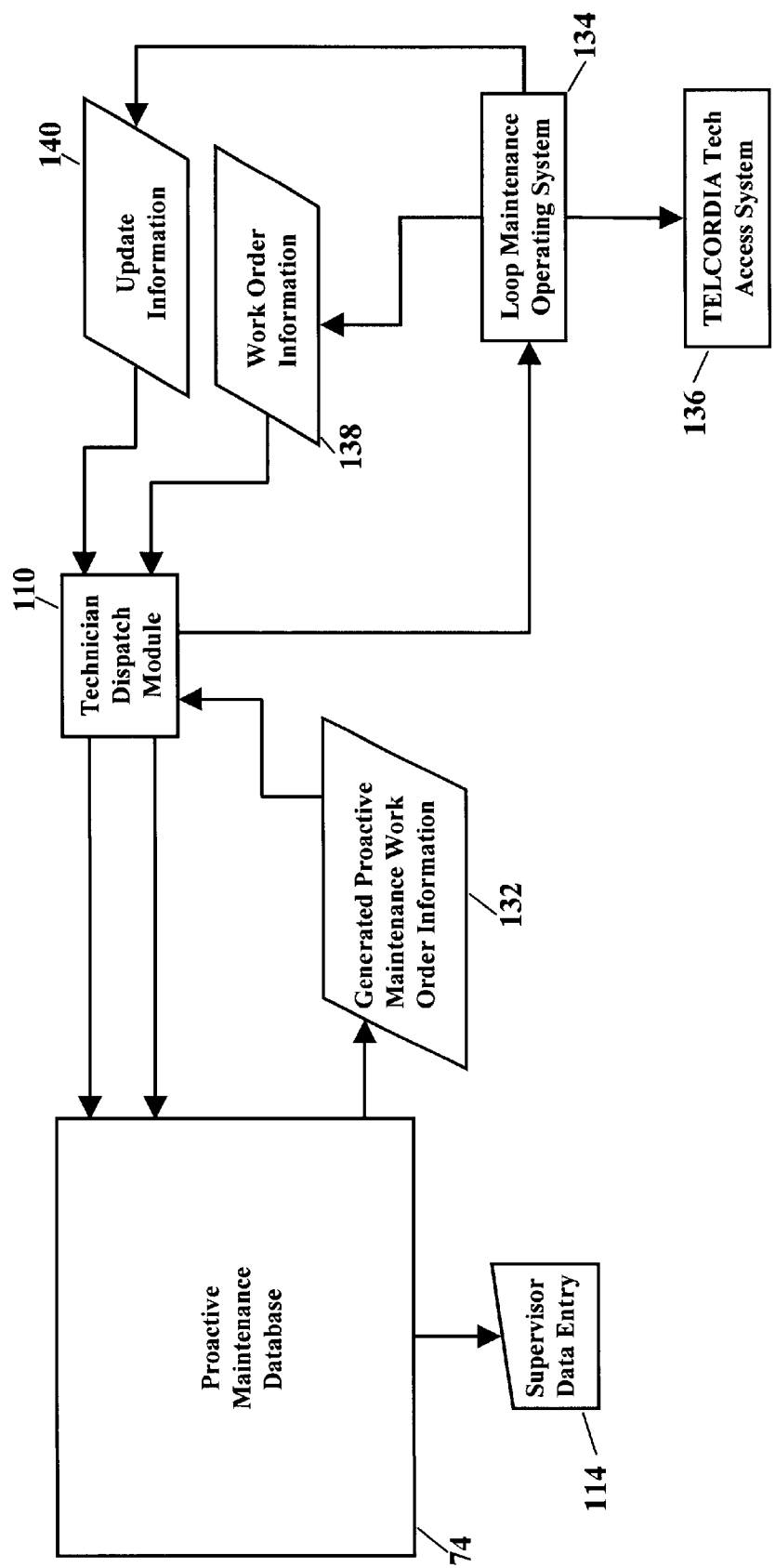
FIG. 10 is a functional block diagram of the Technician Dispatch Module 108 shown in FIG. 5.

FIG. 10 is a functional block diagram of the Technician Dispatch Module 110 shown in FIG. 5. The Technician Dispatch Module 110 not only dispatches proactive maintenance work orders, but the Technician Dispatch Module 110 also tracks field technician proficiencies. Once the Proactive Maintenance Application 20 generates a proactive maintenance work order, the Technician Dispatch Module 110 acquires generated proactive maintenance work order information 132 representing the generated proactive maintenance work order. The Technician Dispatch Module 110 communicates the generated proactive maintenance work order information 132 to a Loop Maintenance Operating System 134. The Loop Maintenance Operating System 134 communicates the generated proactive maintenance work order information 132 to a Tech Access System 136. The Tech Access System 136 is one component of the TELCORDIA™ Work and Force Management Suite of products (TELCORDIA™ is a trademark claimed by Telcordia Technologies, Inc., 445 South St., Morristown, N.J. 07960 USA). The Tech Access System 136 dispatches a work order describing the generated proactive maintenance work order information 132. The Technician Dispatch Module 110, in turn, retrieves and communicates work order information 138 from the Loop Maintenance Operating System 134 to the Proactive Maintenance Application Database 74, with the work order information 138 representing a work order ticket number. The Technician Dispatch Module 110 may also retrieves and communicate hourly update information 140 from the Loop Maintenance Operating System 134 to the Proactive Maintenance Application Database 74. The hourly update information 140 represents the status of each work order ticket number.

Figure 11:
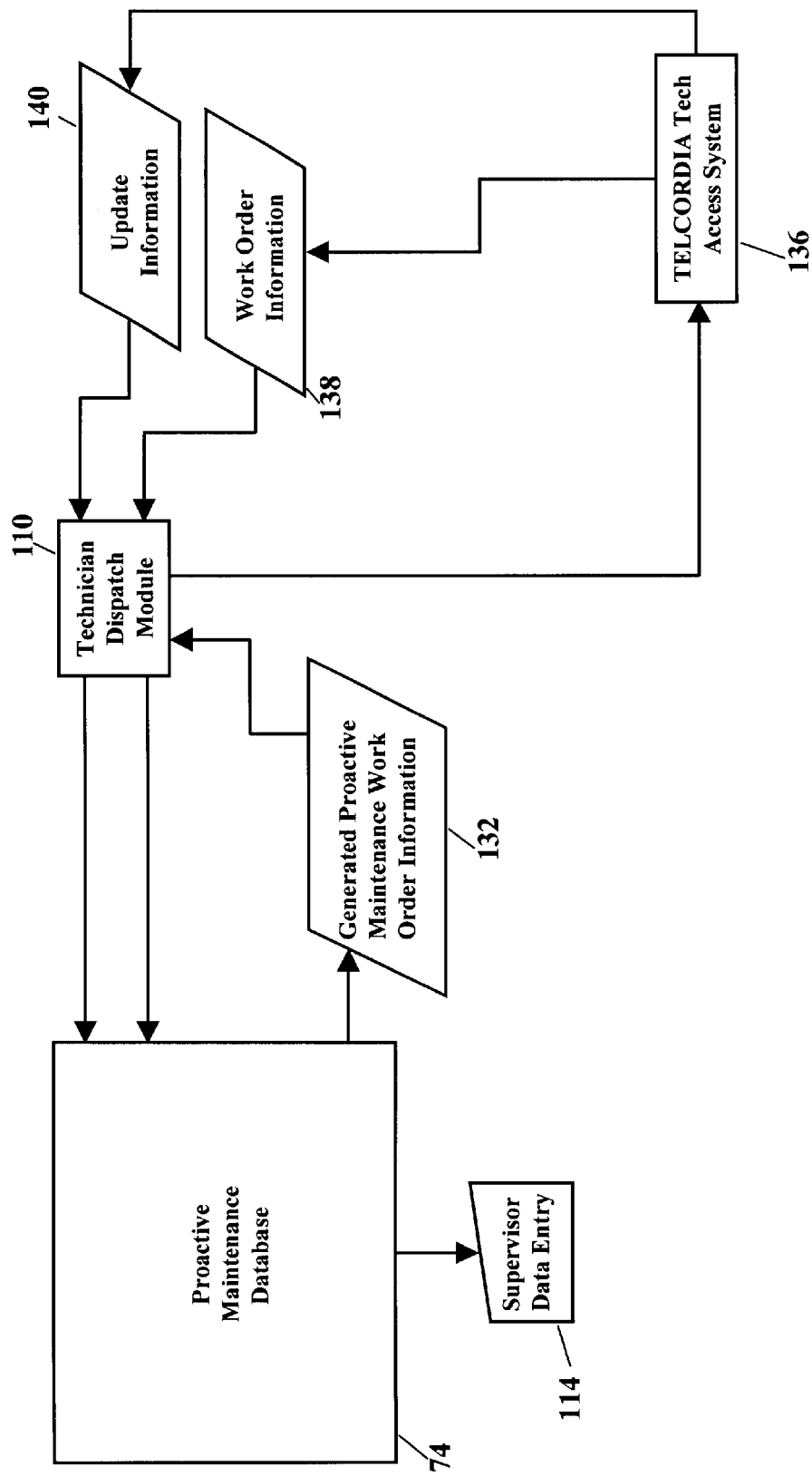
FIG. 11 is a functional block diagram of an alternate embodiment of the Technician Dispatch Module 108 shown in FIG. 5.
Figure 12:
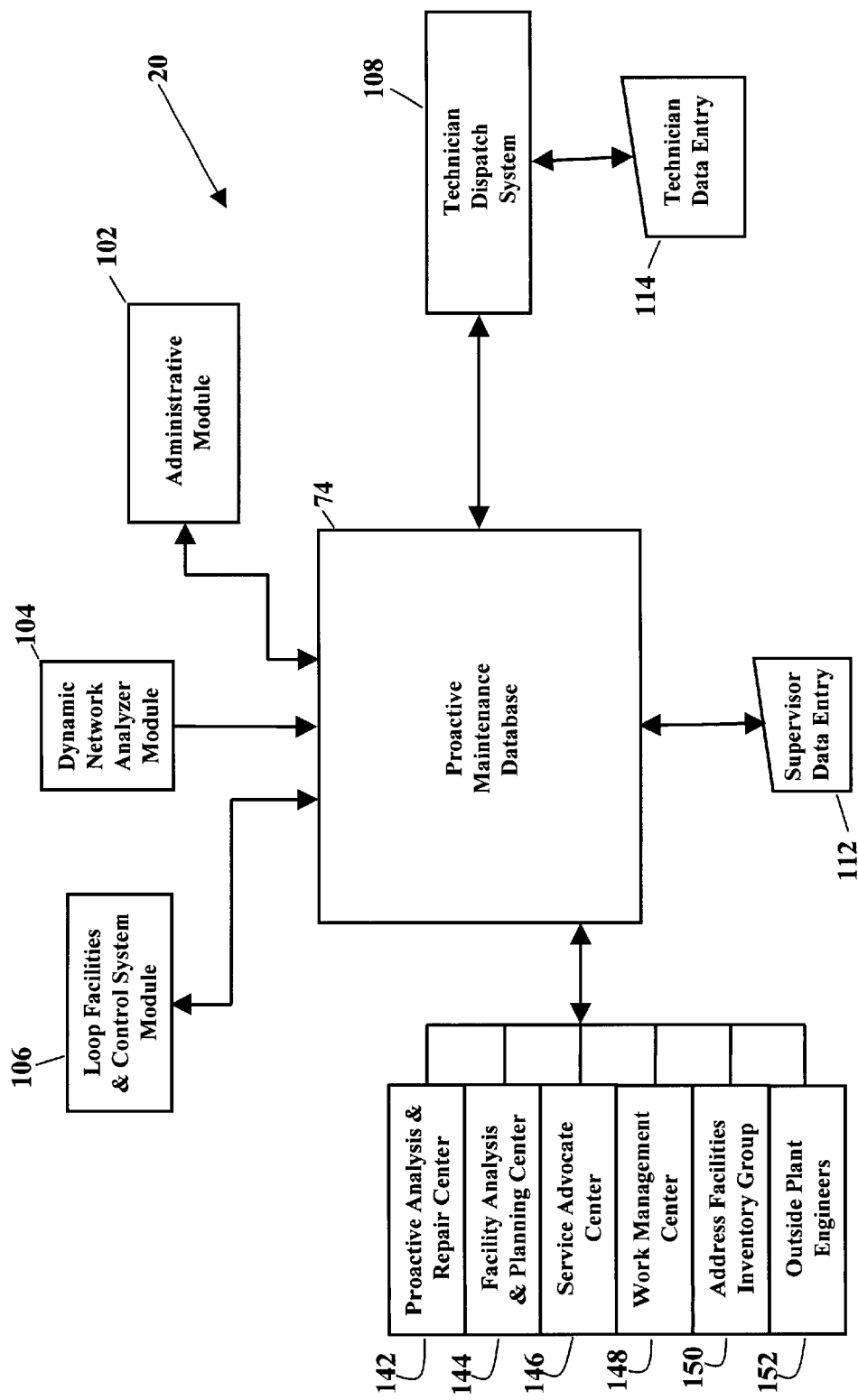
FIG. 12 is a block diagram showing a non-limiting example of the Proactive Maintenance Application.

FIG. 11 is a functional block diagram of an alternative embodiment of the Technician Dispatch Module 110 shown in FIG. 5. This alternative embodiment allows the Technician Dispatch Module 110 to directly interface with the Tech Access System 136. The Technician Dispatch Module 110 communicates the generated proactive maintenance work order information 132 to the Tech Access System 136. The Tech Access System 136 dispatches a work order describing the generated proactive maintenance work order information 132. The Technician Dispatch Module 110, in turn, retrieves and communicates the work order information 138 to the Proactive Maintenance Application Database 74. The Tech Access System 136 also communicates the hourly update information 140 on the status of each work order ticket number.

EXAMPLE

The Proactive Maintenance Application 20 is further illustrated by the following non-limiting example. FIG. 11 is a block diagram showing this particular non-limiting example is further configured for proactively maintaining the local loop (shown as reference numeral 78 in FIG. 4A). This non-limiting example is similar to that shown in FIG. 5, however, this example allows the Proactive Maintenance Application Database 74 to be accessed by several user groups. These user groups include a Proactive Analysis and Repair Center 142, a Facilities Analysis and Planning Center 144, a Service Advocate Center 146, a Work Management Center 148, an Address Facilities Inventory Group 150, and Outside Plant Engineers 152. These user groups have authority to access some or all information stored in the Proactive Maintenance Application Database 74. Some user groups may even have authority to alter information stored in the Proactive Maintenance Application Database 74. The Proactive Analysis and Repair Center 142, for example, has authority to alter the Dynamic Network Analyzer information (shown as reference numeral 118 in FIG. 6). The Facilities Analysis and Planning Center 144, likewise, has authority to assign in bulk any repairs to copper line pairs. The Systems Administrator may authorize as many groups as desired to access and even alter information stored in the Proactive Maintenance Application 20. The Proactive Maintenance Application 20 thus allows dedicated groups to monitor corporate-wide proactive maintenance. This corporate-wide monitoring ensures the local loop is proactively and uniformly maintained in all states and regions.

Once information is acquired and stored in the Proactive Maintenance Application Database 74, the Proactive Maintenance Application 20 prioritizes proactive maintenance procedures. The Proactive Maintenance Application 20 uses weighted formulas to prioritize proactive maintenance work orders. The weighted formulas predict proactive maintenance for Predictor indications, copper line pair changes, predict proactive maintenance for Dynamic Network Analyzer work orders, and predict proactive maintenance bulk copper line pair recovery. The following paragraphs describe each formula and its associated terms.

A weighted formula for predicting proactive maintenance using Predictor trends is first described. As those of ordinary skill recognize, Predictor is a computer program that collects nightly switch information. A Predictor module communicates with the communications network and acquires this nightly switch information. The Proactive Maintenance Application uses this nightly switch information to predict proactive maintenance based upon the Predictor trends. The nightly switch information may also be used by the Dynamic Network Analyzer module to predict proactive maintenance and to indicate TSI's since a work order was created and dispatched. The formula $$\frac{W_1(FEF0) + W_2(FEF1) + W_3(\text{number of defective line pairs}) + W_4(FEF0SI) + W_5(FEF1SI)}{(\text{Time per task for Predictor packages})}$$

has both weighting variables and terms. The weighting variables are $W_1$, $W_2$, $W_3$, $W_4$, and $W_5$, while the terms are FEF0, FEF1, FEF0SI, and FEF1SI. The terms "number of defective line pairs" and "Time per task for Predictor packages" are self-evident to those of ordinary skill and will not be further described. The weighting variables will be later shown and described in a table.

As those of ordinary skill recognize, the terms are common telephony disposition codes. FEF0, for example, indicates a foreign electromotive force was found on the customer's line. A foreign electromotive force may be discovered during a mechanized loop test. FEF1 indicates a battery is present on the F1 facility or the facilities leaving the central office. FEF0SI indicates a foreign electromotive force since a work order was issued. FEF1SI, likewise, indicates a battery is present since a work order was issued.

A weighted formula for predicting copper line pair changes is next described. The formula is $$\frac{A+B}{\text{Time per task for a pair change}}$$

where
$A = W_6(\text{Code } 4) + W_7(\text{Code } 7) + W_8(\text{Code } 9) + W_9(\text{Predictor})$ and
$B = W_{10}(\text{number of defective line pairs}) + W_{11}(\text{TSI4}) + W_{12}(\text{TSI7}) + W_{13}(\text{TSI9})$.

The formula, as above, has both weighting variables and terms. The weighting variables are $W_6$, $W_7$, $W_8$, $W_{11}$, $W_{12}$, and $W_{13}$, while the terms are Code 4, Code 7, Code 9, TSI4, TSI7, and TSI9. The terms "number of defective line pairs" and "time per task for a pair change" are self-evident to those of ordinary skill and will not be further described. The weighting variables will be later shown and described in a table.

The terms, again, are common telephony disposition codes. Code 4 applies to all troubles found in cables, cable terminals, amplifiers, line wire, load coils and protection, field-located concentrators, field-located carrier equipment, and field-located loop electronics. Code 4 also includes trouble reports resulting from a failure of the outside local loop equipment. Code 7 applies to those trouble reports that are tested and verified without dispatching a field technician. Code 7 indicates a trouble report was tested/retested and verified as corrected, either manually or mechanically, so no dispatch is required. Code 7 would include customers who verify their equipment is properly working before a mechanical or manual test is conducted. Code 9 applies when a dispatched field technician cannot locate a root cause of the trouble. Code 9 includes trouble reports referred first to central office forces, but subsequently, dispatched to outside forces.

As those of ordinary skill also understand, the TSI terms indicate Trouble Since Issued (hence "TSI") dispositions. The Trouble Since Issued dispositions (as previously explained with reference to FIG. 6) applies to trouble received after the proactive maintenance work orders have been developed, but, not dispatched. TSI4, for example, indicates Code 4 trouble was received after the proactive maintenance work order was predicted. TSI7 and TSI9, similarly, indicate Code 7 trouble or Code 9 trouble, respectively, was received.

A weighted formula for predicting Dynamic Network Analyzer proactive maintenance is next described. The formula is $$\frac{C+D}{\text{Time per task for Dynamic Network Analyzer work order}}$$

where
$C = W_{14}(\text{Code } 4) + W_{15}(\text{Code } 7) + W_{16}(\text{Code } 9) + W_{17}(\text{Predictor})$ and
$D = W_{18}(\text{number of defective line pairs}) + W_{19}(\text{TSI4}) + W_{20}(\text{TSI7}) + W_{21}(\text{TSI9})$ The terms Code 4, Code 7, Code 9, TSI4, TSI7, and TSI9 are the same as described above. The terms "number of defective line pairs" and "time per task for Dynamic Network Analyzer work order" are self-evident to those of ordinary skill and will not be further described. The weighting variables will be later shown and described in a table.

A weighted formula for predicting bulk copper line pair recovery is next described. The formula is $$\frac{W_{22}(\text{growth})(\text{number of defective line pairs})}{(\text{number of spare line pairs})}.$$
$$(\text{time per task for bulk pair recovery})$$

The term "growth" is the increase in loop activity created by requests for new service and for new customers. The terms "number of defective line pairs," "number of spare line pairs," and "time per task for bulk pair recovery" are again self-evident to those of ordinary skill and will not be further described. The weighting variables are shown and described below.

The weighting variables are chosen based upon field experience. As those of ordinary skill recognize, the weighting variables are used to adjust predicted results. The predicted results are compared with actual field results. The weighting variables are then adjusted until the predicted results closely approximate actual field results. As those of ordinary skill also recognize, the weighting variables may be continually refined to improve predicted work order results. The table below shows the values of the weighting variables used in the non-limiting example. These weighting variables were selected based upon the actual results of 170 predicted work orders.

| Weighting Variable | Value |
| --- | --- |
| $W_1$ | 0.89 |
| $W_2$ | 0.50 |
| $W_3$ | 5.90 |
| $W_4$ | 0.89 |
| $W_5$ | 0.50 |
| $W_6$ | 0.24 |
| $W_7$ | 0.24 |
| $W_8$ | 0.24 |
| $W_9$ | 9.20 |
| $W_{10}$ | 1.60 |
| $W_{11}$ | 0.54 |
| $W_{12}$ | 0.24 |
| $W_{13}$ | 0.24 |
| $W_{14}$ | 0.18 |
| $W_{15}$ | 0.18 |
| $W_{16}$ | 0.45 |
| $W_{17}$ | 13.4 |
| $W_{18}$ | 0.18 |
| $W_{19}$ | 0.90 |
| $W_{20}$ | 0.18 |
| $W_{21}$ | 0.45 |
| $W_{22}$ | 0.08 |

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method for proactively maintaining a telephone system local loop, the method comprising:
   acquiring at least one type of information selected from the group consisting of information from a Dynamic Network Analyzer, information from a Loop Facilities and Control System, and information from a Loop Engineering Information System;

storing the acquired information:

combining the stored information;

predicting proactive maintenance based upon the combined information;

receiving a pending service order information;

merging the pending service order information into the predicted proactive maintenance;

generating work order information describing the predicted proactive maintenance and the merged pending service order information; and dispatching the work order information to a field technician;

wherein the technician automatically and remotely updates the work order information with completed service order information.

2. A method for proactively maintaining a telephone system local loop according to claim 1, wherein the step of combining the stored information further includes weighting the information from the Dynamic Network Analyzer.

3. A method for proactively maintaining a telephone system local loop according to claim 1, wherein the step of combining the stored information further includes weighting the information from the Loop Facilities and Control System.

4. A method for proactively maintaining a telephone system local loop according to claim 1, wherein the method further comprises interfacing with a technician dispatch system to dispatch the work order information to the field technician.

5. A method for proactively maintaining a telephone system local loop according claim 1, wherein the method further comprises interfacing with a TELCORDIA Tech Access System to dispatch the work order information to the field technician.

6. A method for proactively maintaining a telephone system local loop according to claim 1, wherein the method further comprises interfacing with a Loop Maintenance Operating System to dispatch the work order information to the field technician.

7. A method for proactively maintaining a telephone system local loop according to claim 1, whether the method further comprises acquiring update information from a Loop Maintenance Operating System.

8. A method for proactively maintaining a telephone system local loop according to claim 1, wherein the method further comprises acquiring the work order information from a Loop Maintenance Operating System.

9. A method for proactively maintaining a telephone system local loop according to claim 1, wherein the predicted proactive maintenance is weighted with a first set of weights and the stored information is weighted with a second set of weights different than the first set of weights.

10. A method for proactively maintaining a telephone system local loop, the method comprising:

communicating with a communications network and acquiring at least one of customer information associated with copper line pairs, service information associated with the copper line pairs, and information associated with cross-connects;

storing the acquired information;

combining the stored information;

predicting proactive maintenance based upon the combined information;

receiving a pending service order information;

merging the pending service order information into the predicted proactive maintenance;

generating work order information describing the predicted proactive maintenance and the merged pending service order information; and dispatching the work order information to a field technician;

wherein the technician automatically and remotely updates the work order information with completed service order information.

11. A method for proactively maintaining a telephone system local loop according to claim 10, wherein the step of combining the stored information further includes weighting the customer information.

12. A method for proactively maintaining a telephone system local loop according to claim 10, wherein the step of combining the stored information further includes weighting the service information.

13. A system for predicting proactive maintenance of a telephone system local loop, the system comprising:

a Dynamic Network Analyzer module communicating with a communications network and acquiring Dynamic Network Analyzer information;

a Loop Facilities and Control System module communicating with the communications network and acquiring Loop Facilities and Control System information;

a Loop Engineering Information System module communicating with the communications network and acquiring loop engineering information;

a database stored in memory, the database storing the acquired information; and a processor capable of processing information stored in the database and of generating proactive maintenance, the processor further merging a pending service order information into the generated proactive maintenance;

wherein work order information describing the proactive maintenance and the merged pending service order information is dispatched to a field technician, and the technician automatically and remotely updates the work order information with completed service order information.

14. A system according to claim 13, further comprising a technician dispatch module communicating with the communications network and dispatching the work order information to the technician.

15. A computer program product for proactively maintaining a telephone system, comprising:

a computer-readable medium; and a Dynamic Network Analyzer module stored on the medium, the Dynamic Network Analyzer module coupled to a Dynamic Network Analyzer over a communications network, the Dynamic Network Analyzer module acquiring information concerning the Dynamic Network Analyzer, wherein the acquired information is used to predict proactive maintenance, and the predicted proactive maintenance is merged with a pending service order information to generate work order information describing the predicted proactive maintenance and the merged pending service order information; and wherein the work order information is dispatched to a field technician, and the technician automatically and remotely updates the work order information with completed service order information.

16. A computer program product for proactively maintaining a telephone system, comprising:

a computer-readable medium; and a Loop Facilities and Control System module stored on the medium, the Loop Facilities and Control System module coupled to a Loop Facilities and Control System over a communications network, the Loop Facilities and Control System module acquiring information concerning the Loop Facilities and Control System, wherein the acquired information is used to predict a proactive maintenance, and the predicted proactive maintenance is merged with a pending service order information to generate work order information describing the predicted proactive maintenance and the merged pending service order information; and wherein the work order information is dispatched to a field technician, and the technician automatically and remotely updates the work order information with completed service order information.

17. A computer program product for proactively maintaining a telephone system, comprising:

a computer-readable medium; and a Loop Engineering Information System module stored on the medium, the Loop Engineering Information System module coupled to a Loop Engineering Information System over a communications network, the Loop Engineering Information System module acquiring information concerning the Loop Engineering Information System, wherein the acquired information is used to predict a proactive maintenance, and the predicted proactive maintenance is merged with a pending service order information to generate work order information describing the predicted proactive maintenance and the merged pending service order information; and wherein the work order information is dispatched to a field technician, and the technician automatically and remotely updates the work order information with completed service order information.

* * * * *